United States Patent
Amend et al.

(10) Patent No.: US 12,445,388 B2
(45) Date of Patent: Oct. 14, 2025

(54) TECHNIQUES TO REDUCE LATENCY SPIKES IN MULTIPATH COMMUNICATION SYSTEMS

(71) Applicant: Deutsche Telekom AG, Bonn (DE)

(72) Inventors: Markus Amend, Nidda (DE); Nathalie Romo Moreno, Riedstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 18/859,583

(22) PCT Filed: Apr. 27, 2023

(86) PCT No.: PCT/EP2023/061165
§ 371 (c)(1),
(2) Date: Oct. 24, 2024

(87) PCT Pub. No.: WO2023/209116
PCT Pub. Date: Nov. 2, 2023

(65) Prior Publication Data
US 2025/0175434 A1    May 29, 2025

(30) Foreign Application Priority Data
Apr. 28, 2022   (EP) .................................. 22170418

(51) Int. Cl.
*H04L 47/283* (2022.01)
*H04L 43/0852* (2022.01)
*H04L 45/24* (2022.01)

(52) U.S. Cl.
CPC ........ *H04L 47/283* (2013.01); *H04L 43/0852* (2013.01); *H04L 45/24* (2013.01)

(58) Field of Classification Search
CPC .... H04L 43/0852; H04L 45/24; H04L 47/283
See application file for complete search history.

(56) References Cited

U.S. PATENT DOCUMENTS

2016/0337223 A1* 11/2016 Mackay .............. H04L 43/0894
2017/0012861 A1*  1/2017 Blumenthal ............ H04L 45/24
(Continued)

FOREIGN PATENT DOCUMENTS

EP          3 531 637 A1     8/2019

OTHER PUBLICATIONS

Amend Markus et al, "A Framework for Multiaccess Support for Unreliable Internet Traffic using Multipath DCCP", 2019 IEEE 44th Conference on Local Computer Networks (LCN), IEEE, Oct. 14, 2019 (Oct. 14, 2019), p. 316-323, XP033713657.
(Continued)

*Primary Examiner* — Donald L Mills
(74) *Attorney, Agent, or Firm* — Leydig, Voit & Mayer, Ltd.

(57) ABSTRACT

A method for increasing the efficiency of a multipath (MP) communication network includes: providing at least a first communication path and a second communication path for exchanging data packets between a sender entity and a receiver entity; determining timing information about the first communication path and about the second communication path; calculating a latency difference $\Delta L$ by using the timing information of the first communication path and of the second communication path; and delaying data packets sent over the communication path with the shorter latency value by a time interval $T_{Delay}$ that has at least the length of the latency difference $\Delta L$.

12 Claims, 3 Drawing Sheets

(56) References Cited

U.S. PATENT DOCUMENTS

2021/0351997 A1* 11/2021 Luft ..................... H04L 43/16
2023/0336493 A1* 10/2023 Gilson ............... H04L 43/0852

OTHER PUBLICATIONS

Deutsche Telekom AG, "New Solution to KI#2: Re-ordering Modes and Features", vol. {0} SA WG2, No. {0} e-meeting; Apr. 6, 2022-Apr. 12, 2022, Mar. 29, 2022 (Mar. 29, 2022), p. 1-5, 3GPP Draft; S2-2202728, 3rd Generation Partnership Project (3GPP), Mobile Competence Centre; 650, Route Des Lucioles; F-06921 Sophia-Antipolis Cedex; France Retrieved from the Internet: URL:https://ftp.3gpp.org/tsg_sa/WG2_Arch/TSGS2_150E_Electronic_ 2022-04/Docs/S2-2202728.zip_ S2-2202728_Re-ordering_v4.doc, XP052133562 [retrieved on Mar. 29, 2022].

Becke Martin et al, "Alternative transmission strategies for multipath transport of multimedia streams over wireless networks", Jun. 26, 2013 (Jun. 26, 2013), p. 147-154, XP032477518, [retrieved on Aug. 12, 2013].

* cited by examiner

TECHNIQUES TO REDUCE LATENCY SPIKES IN MULTIPATH COMMUNICATION SYSTEMS

CROSS-REFERENCE TO PRIOR APPLICATIONS

This application is a U.S. National Phase application under 35 U.S.C. § 371 of International Application No. PCT/EP2023/061165, filed on Apr. 27, 2023, and claims benefit to European Patent Application No. EP 22170418.2, filed on Apr. 28, 2022. The International Application was published in English on Nov. 2, 2023 as WO 2023/209116 A1 under PCT Article 21(2).

FIELD

The invention relates to techniques for providing a more uniform latency between network entities, in particular between a sender entity and a receiving entity. The invention further relates a method, a path latency difference compensator, a network entity, a communication system and a computer program product for providing the more uniform latency.

BACKGROUND

A multipath system typically comprises a sending entity and a receiving entity with multiple transport paths that connect these two entities and enable a respective exchange of data packets. The sender entity is typically responsible for distributing the generated traffic across the available multipath, in particular a fixed line and a mobile path, while an entity associated to the receiver side, in particular the receiving entity, collects the data sent over the at least two collocation paths and forwards it to the actual receiver entity.

In general, the data packets, which are sent over different communication paths, need different time intervals to arrive at the receiving entity. It can happen, that a second data packet that is sent over a second communication path overtakes a first data packet sent over the first communication path even if it was sent after the first data packet. The term that is commonly used to describe the travel time between the sender entity and the receiver entity is called latency. It follows that each communication path has its own latency value. It even can happen that the latency value of a communication path changes over time, in particular for mobile communication paths.

A known problem that arises from these different latency values of the communication paths is the so-called out-of-order delivery of the data packets with respect to the receiver side if data traffic is split across communication paths with disjoint characteristics, in particular latency. A way to overcome this out-of-order delivery and to efficiently detect packet loss is to apply a connection sequencing on the sending side, in particular within the sender entity, and to use this information on the receiver side to reassemble the traffic stream of data packets.

EP 3 531 637 A1 describes the procedure of sequencing data packets in order to enable in order delivery and to detect early packet loss as to reduce latency effects. The teaching of EP 3 531 637 A1 allows in-order delivery as long as the order queue allows to hold all received data packets until a missing packet arrives or packet loss is detected. EP 3 531 637 A1 proposes an optimization to overcome scenarios where packet loss causes latency spikes in the reordering process. Specifically, fast packet loss detection calculated from the latency differences potentially reduces the time to detect packet loss and enables to move on with the next data packets in the reordering queue. However, even if those methods provide more efficient transmission of data packets, latency spikes can still occur. Latency spikes can be described as if the receiver entity has to wait for different time periods until the next data packet arrives. The latency spikes mean in particular those time periods that are especially large. Those latency spikes typically lead to a decreased network performance.

So, even if the teaching of EP 3 531 637 A1 is applied significant jitter can happen, especially in the case described in the following: EP 3 531 637 A1 provides some ways to reduce jitter caused by packet loss, but it does not provide a general way to compensate the latency difference between disjoint paths. For example, if a first, a second and a fourth packet is sent over a 10 ms path and a third packet over a 100 ms path. For simplicity, it is assumed that packets are sent simultaneously without an inter-send gap (directly after each other). By receiving the first two packets in row, the receiver will experience an sender to receiver latency close to 10 ms. The fourth packet has to be queued until the third packet arrives and causes therefore a latency spike of 90 ms (paths latency difference) perceived by the receiver. This means an ordinary alternation between disjoint path in the packet scheduling process leads to a fluctuating end-to-end latency imposed by a re-ordering process. The latency variation (jitter) is dominated by the latency difference of the disjoint paths. In another scenario, this latency variation is additionally amplified by a timer configuration used in the re-ordering process as described in EP 3 531 637 A1. This timer is used to assume a packet loss if an outstanding packet does not arrive "in time". In case the timer value is higher than the latency difference, the timer value determines the maximum sender to receiver latency, while the minimum sender to receiver latency is determined by the path with the fastest propagation time.

For latency and jitter sensitive services or transport protocols, this might be interpreted as transport issues with the consequence to slow down the transmission rate or increase robustness, which decreases the effective rate (good put).

Usually, multipath network protocols such as MPTCP [1], MP-DCCP [3], MP-QUIC [2], CMT-SCTP [4], GRE bonding [5] take care of the transport between sender and receiver in a multi-path system and all provide ways of re-ordering as described above using sequencing information. However, they all suffer from the latency spikes introduced by re-order packets received with disjoint path latencies.

Transport protocols, congestion controls or services, which are sensitive to latency bouncing lead to (partially) non-functioning services and/or to a reduction of performance due to inherent control loops. In a worst-case scenario, it can happen that the end-to-end experienced performance over multi-path falls below the one of single-path transport.

SUMMARY

In an exemplary embodiment, the present invention provides a method for increasing the efficiency of a multipath (MP) communication network. The method comprises the following steps: providing at least a first communication path and a second communication path for exchanging data packets between a sender entity and a receiver entity; determining timing information about the first communication path and about the second communication path, wherein the timing information is a latency L1 of the first communication path and a latency L2 of the second communication path, a round trip time R1 of the first communication path and a round trip time R2 of the second communication path, and/or time stamps of a data field of a first data packet sent via the first communication path and a second data packet sent via the second communication path, wherein the latency is a travel time of a data packet between the sender entity and the receiver entity; calculating a latency difference ΔL by using the timing information of the first communication path and of the second communication path; and delaying data packets sent over the communication path with the shorter latency value by a time interval $T_{Delay}$ that has at least the length of the latency difference ΔL. The delaying is performed by the sender entity, the receiver entity, and/or a server associated to a telecommunication provider. Data packets transmitted over the first or the second communication path are queued in a reordering queue, wherein the reordering queue reorders the data packets and provides the data packets to the receiver. If $T_{static} > L_i : T_{Delay}$ has at least the length of the latency difference ΔL plus $(T_{static} - L_i)$, wherein $T_{static}$ is the time length of a static expiration timer of the reordering queue of the receiver entity, and $L_i$ is the highest latency value of the first or the second communication path, wherein data packets sent over the communication path with the shorter latency are being delayed by $T_{Delay} = \Delta L$ plus $(T_{static} - L_i)$, and wherein data packets sent over the communication path with a higher latency are being delayed by $T_{Delay} = (T_{static} - L_i)$; or if $T_{dynamic} > L_i : T_{Delay}$ has at least the length of the latency difference ΔL plus $(T_{dynamic} - L_i)$, wherein $T_{dynamic}$ is the time length of a dynamic expiration timer of the reordering queue of the receiver entity, and $L_i$ is the highest latency value of the first or the second communication path, wherein data packets sent over the communication path with the shorter latency are being delayed by $T_{Delay} = \Delta L$ plus $(T_{dynamic} - L_i)$, and wherein data packets sent over the communication path with a higher latency are being delayed by $T_{Delay} = (T_{dynamic} - L_i)$.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
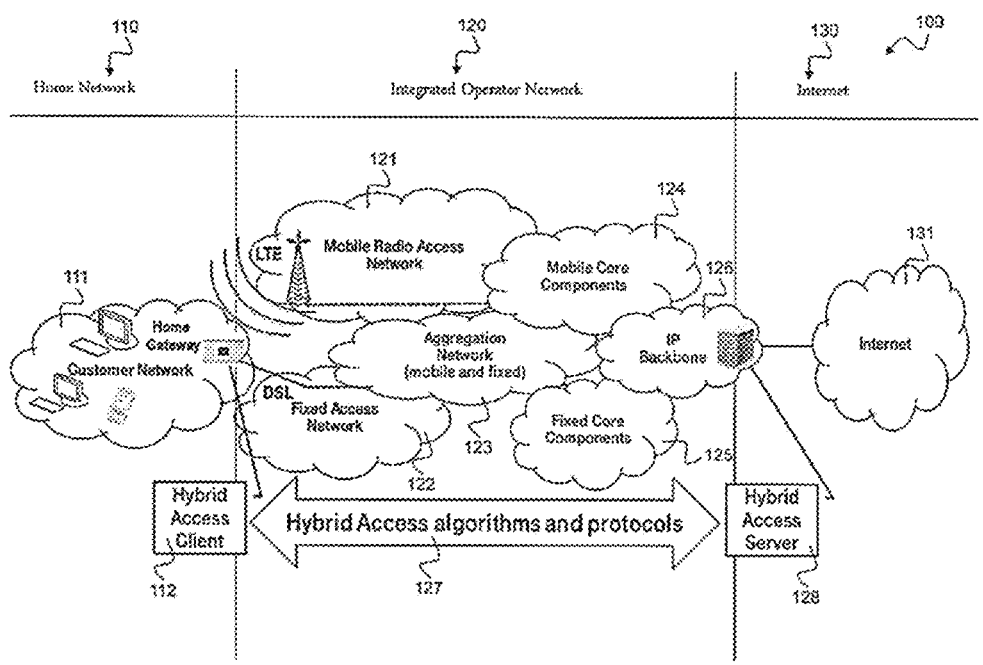
FIG. 1 shows a reference topology for hybrid access (HA)

Exemplary embodiments of the invention provide techniques to reduce the effect of latency spikes in multipath communication systems.

Features of various aspects of the invention described below or various examples of implementations may be combined with each other, unless this is explicitly excluded or is technically impossible.

Since the teachings of the present invention are combined with the subject matter of the EP 3 531 637 A1 in preferred embodiments, the full disclosure of the EP 3 531 637 A1 is hereby incorporated herein in its entirety.

According to a first aspect of the invention, the invention provides a method for increasing the efficiency of a multipath communication network, wherein the method comprises the following steps:

providing at least a first communication path and a second communication path for exchanging data packets between a sender entity and a receiver entity;
  the first communication path and the second communication path can be of different technical type. For example, the first communication path can be a fixed line communication path, like DSL, and the second communication path can be a mobile communication path like 4G or 5G. The data packets can be sent over at least the two communication paths to increase the bandwidth between the sender entity and the receiver entity. Typically, a multipath scheduler associated to the sender entity distributes the data packets amongst the different communication paths. The sender entity and/or the receiver entity can be a server, a computer, smartphone or the like.

using timing information about the first communication path and about the second communication path, wherein a latency of the first communication path and of the second communication path can be calculated based on this timing information;
  the timing information can be supplied by a telecommunication provider that is associated to the communication network and/or can be measured by measuring entity within the communication network, in particular by the sender entity and/or the receiver entity;
  in an embodiment this step can be: using timing information about the first communication path and about the second communication path, wherein the timing information is the latency L1 of the first communication path and the latency L2 of the second communication path, the round trip time R1 of the first communication path and round trip time R2 of the second communication path, and/or time stamps of a data field of the first data packet and the second data packet; and calculating a latency of the first communication path and of the second communication path based on this timing information;

calculating a latency difference ΔL by using the latency information of the first communication path and of the second communication path;
  the latency difference ΔL describes in units of seconds, in particular milliseconds, the difference in time when the data packet arrives over the first communication path or the second communication path. For example if it takes 10 ms for the first data packet to travel over the first communication path and takes 100 ms for the second data packet to travel over the second communication path, then latency difference can be calculated as being 90 ms;

delaying data packets sent over the communication path with the shorter latency by a time interval $T_{Delay}$ that has at least the length of the latency difference ΔL.

the path with the higher latency is the path, where it takes longer for the data packet to travel from the sender entity to the receiver entity. With respect to the example above, this would be the second communication path with its 100 ms travel time. Technically, this delay $T_{Delay}$ can be realized by storing the data packets sent over the communication path with a higher latency in a buffer for the time period of $T_{Delay}$ before forwarding the data packets to the receiver entity, in particular to the reordering queue. It is also possible to first apply the re-ordering and then to delay the data packets. Technically, this can even be a buffer of the reordering queue that is logically separated from the data packets that are already within the reordering queue.

The method can be carried out by a distinct entity and/or can be implemented as a software solution within the sender entity and/or the receiver entity.

This method provides the advantage of reducing the jitter introduced by splitting traffic across multiple paths. Due to the delay $T_{Delay}$, it "tricks" the receiver entity into thinking that all the data packets, independently which communication path they actually have taken, have basically the same latency. Therefore, the problematic latency spikes are greatly reduced and the network performance is greatly improved. The invention is able to provide a more unified end-two-end latency between the sender entity and the receiver entity.

Due to the delaying aspect, the invention can be called "path latency difference compensator" (PLDC). The invention will use timing information instead of only using sequencing information to come closer to a flat end-to-end latency. This delay compensation function can typically reside in the receiving entity, even if it is possible that it is applied in the sending entity. The timing information required for PLDC can be exposed as individual path latencies, the latency difference, sending timestamps or receiving timestamps. Also, latency equivalent information such as the round-trip-time (RTT) or derived information such as the smoothed RTT (SRTT) can be used instead. For operation of the PLDC module, the path timing information can be provided as part of the PLDC module itself (e.g., in static known systems or in-band measurement of a multi-path protocol) or through external interfaces (out-of-band measurement (e.g., 3GPP performance measurement function (PMF)), decoupling of PLDC and multi-path protocol or in general if external systems provide timing information). Having a dynamic update of the timing information allows an efficient way of providing an end-to-end latency with less jitter in environments with volatile path characteristics.

In an embodiment, the timing information can be calculated by using known technical parameters of the first communication path and the second communication path and/or by sending at least a first data packet over the first communication path and a second data packet over the second communication path and measuring the timing information.

In particular, the provider of the communication network knows about the technical parameters of the first communication path and the second communication path. If those technical parameters are known, it is in principle possible to calculate the traveling time, in other words latency, of the data packets over the respective paths. This enables at least an estimation of the latency that is close to a measured latency without implementing a way to actually measure the timing information. On the other hand, measuring the timing information provides the advantage that the actual latency can be retrieved from those measured values and that fluctuations of the latency can be taken into account. Typically, measuring values will have a certain distribution, so that one typically chooses the mean value or the median of those measured values to calculate the latency. Choosing the median has the advantage that the influence of large outliers is minimized. It is even possible to combine the two options in that one uses the latency calculated from the technical parameters as a kind of "starting" latency that can be replaced by the actual "measured" latency in the course of the communication.

In a further embodiment, the latency between the sender entity and the receiver entity can be stored within the table, for example within the receiver entity. This stored latency value represents the latency that was assessed from the previous communication between the two entities and can serve as a kind of best guess or starting latency if those two entities perform their next communication.

In an embodiment, the timing information is the latency $L_1$ of the first communication path and the latency $L_2$ of the second communication path, the round trip time $R_1$ of the first communication path and round trip time $R_2$ of the second communication path, and/or time stamps of a data field of the first data packet and the second data packet. For example, if the round trip time is used to calculate the latency difference $\Delta L$, one can assume that, in particular two successive, data packets are sent at the same time.

This provides the advantage that $T_{Delay}$ can be calculated from values that are actually associated to the data packets and can easily be extracted and/or measured in the course of the communication. It is possible to create distinct data fields for the timestamps of the data packets order to use existing protocols that already have timestamps. For example, the time stamp can be the time at which the data packet is sent from the sender entity over the first or the second communication path. The receiver side can then register at which time point the respective data packet arrives and henceforth calculate the latency.

In an embodiment, the timestamps of the data field use synchronized clocks. This provides the advantage that no difference between those individual clocks influences the calculation of the latency so that the latency is only dependent on the actual traveling time.

In an embodiment, the timing information is exchanged by using multiparty real-time text (MP_RTT), QUIC, transmission control protocol (TCP) and/or datagram congestion control protocol (DCCP) timestamp option if MP-DCCP, MP-QUIC, and/or MP-TCP protocol is applied between the sender entity and the receiver entity.

This provides the advantage that already existing protocols can be used to obtain the timing information and henceforth to calculate $T_{Delay}$.

In an embodiment, the latency difference $\Delta L$ between the sender entity and the receiver entity can be stored within the table.

This provides the advantage that this latency difference $\Delta L$ can be used as a starting value to calculate $T_{Delay}$ for the next communication between the sender entity and the receiver entity In an embodiment, the latency difference $\Delta L$ is dynamically adjusted. This provides the advantage that the method can react and compensate if a communication path changes its transmission characteristics. In this case, it is especially advantageous to gain the timing information by measuring the timing information instead of calculating the latency based on technical parameters. In particular, mobile communication paths can show significant variations with respect to their transmission characteristics that have an influence on the latency.

As EP 3 531 637 A1 describes optimized re-ordering mechanism using connection and path sequencing information to reduce latency spikes introduced by packet loss, but it does not provide a flat end-to-end latency. In a re-ordering queue packet loss has to be detected to continue with the forwarding of subsequent packets. Using sequence numbers only, this does not provide a solution for that in any case and therefore the only indication of packet loss is provided by a queue overflow or if a packet is outstanding for a certain time (e.g., 150 ms). In case the latency difference is below 100 ms, the end-to-end latency will always jump to 150 ms if packet loss appears. Another exemplary scenario within the teaching of EP 3 531 637 A1 is the following. EP 3 531 637 A1 uses a static expiration timer that determines basically how long the reordering process waits for missing data packets until it assumes that a data packet loss has been occurred. It follows that the value of the static expiration timer will then cause latency spikes simply because it waits for the predefined time duration.

The invention solves this problem as follows: In an embodiment, $T_{Delay}$ has at least the length of the latency difference $\Delta L$ plus $(T_{static}-L_i)$, wherein $T_{static}$ is the time length of a static expiration timer of a reordering queue of the receiver entity, and $L_i$ is the highest latency value of the first or the second communication path, and if $T_{static}>L_i$.

Within the context of the invention, the data packets transmitted over the first or the second communication path can be queued in a reordering queue, wherein the reordering queue reorders the data packets and provides the data packets to the receiver.

Within the context of the invention, the features of the claims 8 and/or 9 are only applied if $T_{static}$ and/or $T_{dynamic}$ is smaller than $L_i$. This can be expressed as follows in programming language:

--- if ($T_{static}$ is smaller than Li)
{
wherein $T_{Delay}$ has at least the length of the latency difference $\Delta L$ plus $(T_{static} - L_i)$, wherein $T_{static}$ is the time length of a static expiration timer of the reordering queue of the receiver entity, and $L_i$ is the highest latency value of the first or the second communication path;
}

---

This means that this embodiment is applied if the static expiration timer is higher than the highest path latency. It follows that the PLDC takes time duration of the static expiration timer into account and delays all paths in the multi-path system to equalize latency spikes by the timer. Assuming the previous exemplary path latencies, 10 ms and 100 ms, and assume a static timer value of 150 ms. To minimize latency variation, the 10 ms path is additionally delayed by 50 ms resulting in 140 ms total and the previously undelayed 100 ms path is delayed by 50 ms as well. It follows a more uniform latency between the sender entity and the receiver entity even if an expiration timer is applied in the reordering process. Hence, in the embodiment, data packets sent over the communication path with the shorter latency are delayed by $T_{Delay}=\Delta L$ plus $(T_{static}-L_i)$, wherein data packets sent over the communication path with a higher latency are delayed by $T_{Delay}=(T_{static}-L_i)$.

In a further embodiment, $T_{Delay}$ has at least the length of the latency difference $\Delta L$ plus $(T_{dynamic}-L_i)$, wherein $T_{dynamic}$ is the time length of a dynamic expiration timer of a reordering queue of the receiving entity, and $L_i$ is the highest latency value of the first or the second communication path, and if $T_{dynamic}>L_i$. Hence, in the embodiment, data packets sent over the communication path with the shorter latency are delayed by $T_{Delay}=\Delta L$ plus $(T_{dynamic}-L_i)$, wherein data packets sent over the communication path with a higher latency are delayed by $T_{Delay}=(T_{dynamic}-L_i)$. This provides the advantage that dynamic variations of the communication path can be assessed and compensated so that it is possible to realize a more uniform latency between the sender entity and the receiver entity even if an expiration timer is applied within the reordering process.

Hence, the features above can be applied in the following case:

--- if ($T_{dynamic}$ is smaller than $L_i$)
{
wherein $T_{Delay}$ has at least the length of the latency difference $\Delta L$ plus $(T_{dynamic} - L_i)$, wherein $T_{dynamic}$ is the time length of a static expiration timer of the reordering queue of the receiver entity, and $L_i$ is the highest latency value of the first or the second communication path ;
}

---

In an embodiment, an offset value $T_{Offset}$ is added to $T_{Delay}$ in order to delay the data packets. This provides the advantage to overcome variations in the individual path latencies and to increase the likelihood that missing packets arrive even in those scenarios. An appropriate offset value can be calculated by considering standard deviations of the measured timing information. It follows that it is also possible that the offset value dynamically changes according to the measured timing information.

According to a second aspect of the invention a path latency difference compensator, PDLC, is provided for increasing the efficiency of a multipath communication network, wherein the PDLC comprises an input interface and an output interface for data packets send over a first and/or a second communication path;

a processing unit, wherein an algorithm is implemented on the processing unit that is programmed to use timing information about the first communication path and about the second communication path, wherein a latency of the first communication path and of the second communication path can be calculated based on this timing information;

to calculate a latency difference $\Delta L$ by using the latency information of the first communication path and of the second communication path;

to generate instructions to delay data packets sent over the communication path with the shorter latency by a time interval $T_{Delay}$ that has at least the length of the latency difference $\Delta L$ and to send theses instructions to a buffering unit, the buffering unit, wherein the buffering unit is configured to delay the data packets by $T_{Delay}$ before forwarding the data packets via the output interface.

In particular, the PDLC is configured to carry out the method described above and also has the advantages as described in the context of the method.

In an embodiment, data packets are delayed within the sending entity, between the sending entity and the receiving entity, and/or within the receiving entity. This provides the advantage that the solution can be implemented very flexible within various entities of the communication network. This distribution also has the benefit that no single entity is needed with such huge buffer memory to delay a vast amount of data packets that can occur within the Internet. It also provides the advantage, that the path latency difference compensator can be implemented at preferred locations.

According to a third aspect of the invention, a network entity is provided for increasing the efficiency of a multipath communication network configured for multipath communication over a communication network, wherein the network entity comprises a path latency difference compensator as described above.

If the PDLC is associated to the receiver entity, it is in principle possible to use the buffer of the reordering queue.

In principle, the network entity and can be a computer, a server, a tablet and/or a smart phone. However, it is of particular advantage if the PDLC is associated or even implemented within a server associated to a telecommunication provider. This provides the advantage that the method can easily be implemented on a server so that other terminals that communicate with a server, for example smart phones, can benefit from a method according to the invention without the need to be adapted to the method. Such an upgraded server can even be used for indirect communication of two smartphones. However, if two smartphones are used in a direct communication mode, the PDLC should be implemented at least within one of those smartphones to benefit from the method.

According to a fourth aspect of the invention, a multipath communication system is provided, wherein the multipath communication system comprises
 a sender entity and a receiver entity, wherein the sender entity and the receiver entity exchange data traffic via a first communication path and the second communication path;
 a path latency difference compensator as described above, wherein the PDLC is arranged between the sender entity and the receiver entity, and/or the PDLC is implemented within the sender entity and/or the receiver entity.

According to a fifth aspect of the invention, a computer program is provided, wherein the computer program comprises instructions which, when the program is executed by a computer, in particular by the path latency difference compensator, cause the computer to carry out the steps of the method described above.

It follows that it is possible to implement the invention as a software solution in the form of a software module within the network entity.

In the following detailed description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense.

For instance, it is understood that a disclosure in connection with a described method may also hold true for a corresponding device or system configured to perform the method and vice versa. For example, if a specific method step is described, a corresponding device may include a unit to perform the described method step. Further, it is understood that the features of the various exemplary aspects described herein may be combined with each other, unless specifically noted otherwise.

FIG. 1 shows a reference topology 100 for hybrid access (HA) for multipath communication systems. The reference topology 100 illustrates the home network zone 110 with customer network 111 and home gateway with hybrid access client 112, the integrated operator network 120 with a variety of operator networks 121, 122, 123, 124, 125, 126 and the Internet zone 130 with the Internet 131. At the operator networks 121, 122, 123, 124, 125, 126 hybrid access algorithms and protocols 127 are implemented to connect the hybrid access client 112 with the hybrid access server 128 for connection with the Internet 131. More specifically, they are implemented in 112 and 128 to bridge 121, 122, 123, 124, 125, and 126.

Hybrid access (HA) combines at least two different network links with the same or different network technology; for example, it combines the access over the fixed network 122 with the access over the cellular network 121. FIG. 1 shows a typical scenario for HA but can also be implemented as an over the top (OTT) solution. The HA client 112 has at least two access interfaces, one for example for digital subscriber line (DSL) access 122 and another one for example for access to the Long Term Evolution (LTE) or 5G network 121. The considerations on the HA algorithms are focused on a distributed client-server solution with client functionality in the residential gateway and server functionality (HA server 128) in a data center at the network of the operator 126 or in the public Internet 131. However, multipath usage can be also directly applied on network entities, without having intermediate devices on behalf.

Figure 2:
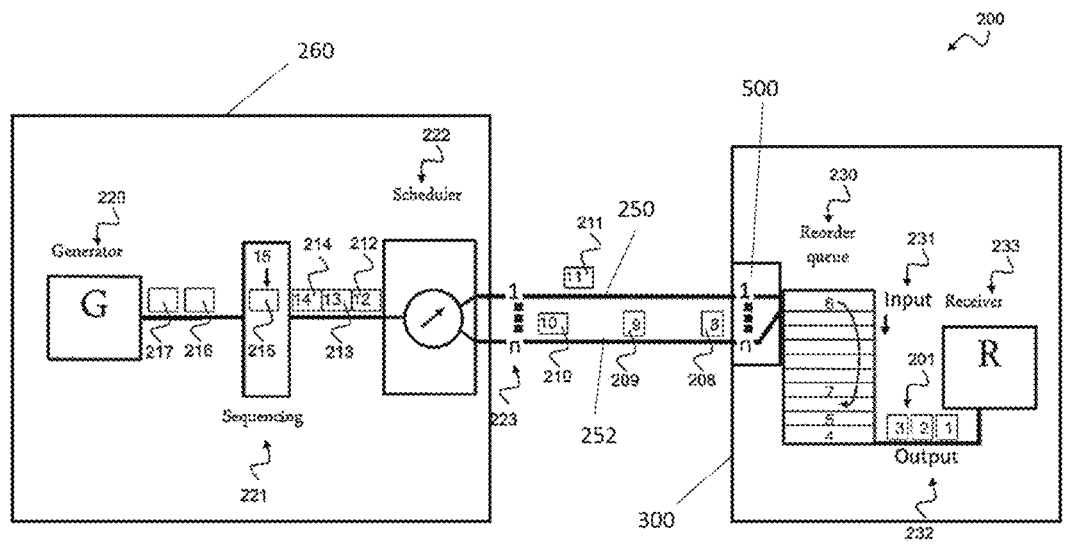
FIG. 2 shows a schematic diagram illustrating a hybrid access sequencing and reordering mechanism.

FIG. 2 shows a schematic diagram illustrating a common hybrid access sequencing and reordering mechanism of a multipath communication system 200.

The multipath communication system 200 comprises
 a sender entity 260 and a receiver entity 300, wherein the sender entity 260 and the receiver entity 300 exchange data traffic via a first communication path 250 and a second communication path 252;

The multipath communication system 200 can also comprise a path latency difference compensator (PDLC) 500 that will be described in detail below. The PDLC 500 delays data packets according to the method 400 to get to a more uniform e2e latency. The PDLC 500 can be implemented as an extra entity or it can be integrated within the sender entity 260 and/or the receiver entity 300. Preferably, the PDLC 500 can be implemented as a pure software solution within the sender entity 260 and/or the receiver entity 300.

A generator 220 generates data packets 217, 216 that pass a sequencing module 221 which assigns each packet 215 a respective sequence number. The sequenced data packets 212, 213, 214 are passed to a scheduler 222 which schedules the data packets to multiple paths 223 of a multipath channel. A sender entity 260 can comprise the generator 220, the sequencing module 221, the scheduler 222 and the interfaces to the respective multiple paths 223. In particular that data packets are distributed to a first communication path 250 and second communication path 252, wherein the first communication path 250 can be a fixed line and the second communication path 252 can be a 5G mobile communication path.

The data packets ordered in sequence 212, 213, 214 are transmitted over the multipath channel and are queued in a reorder queue 230 at receiver side where they arrive at an input 231 of the reorder queue 230. In the reorder queue 230 the data packets are reordered and reordered data packets 201 are provided at an output 232 to the receiver 233. It is shown that a data packets 211 with the sequence number 11 is transmitted over the first communication path 250, while data packets 208, 209, 210 with the respective sequence numbers 8, 9, 10 are transmitted over the second communication path 252. Since the communication paths are technically different and/or have different length it follows that the respective data packets have different latencies depending if they are sent over the first communication path 250 or over the second communication path 252.

Figure 3:
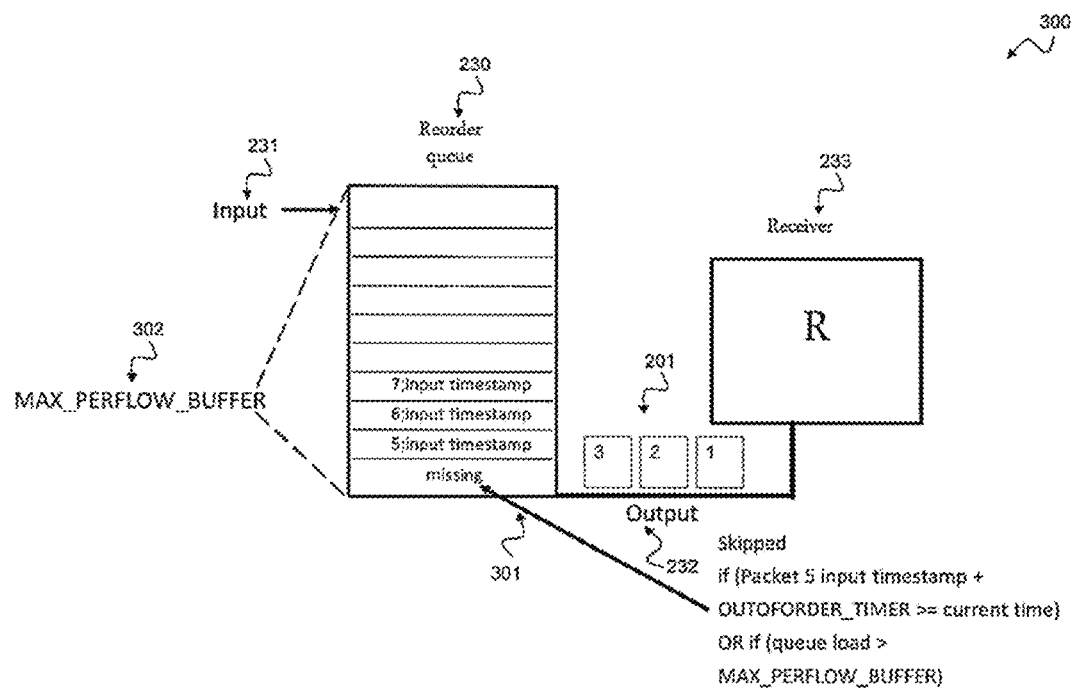
FIG. 3 shows a schematic diagram illustrating a receiver entity.

FIG. 3 shows a schematic diagram illustrating a receiver entity 300 with a parameterized reordering queue according to RFC 8157. The receiver entity 300 can include a reorder queue 230 and a receiver 233. The reorder queue 230 has an input 231 receiving data packets that may be out-of-sequence. A buffer length of the reorder queue is denoted as MAX_PERFLOW_BUFFER 302. Data packets received are buffered in the reorder queue together with a timestamp. For example, missing packet 4 is skipped, if not arriving, from the reorder queue 230 if the following condition 301 is true: (packet 5 input timestamp+ OUTOFORDER_TIMER>=current time) OR (queue load>MAX_PERFLOW_BUFFER).

That means, a missing packet, e.g. packet with sequence number 4, is skipped from the reorder queue 230 if input timestamp of packet with sequence number 5 plus value of OUTOFORDER_TIMER is greater or equal than the current time; or if a queue load of the reorder queue 230 is greater than value of MAX_PERFLOW_BUFFER. Both parameters OUTOFORDER_TIMER and MAX_PERFLOW_BUFFER may be predefined values or constants. At the output 232 of the reorder queue 230 reordered data packets 201 are provided to the receiver 233.

The receiver entity 300 shown in FIG. 3 orders the packets based on the sender side assigned sequence number. Missing packets are assumed lost, if the reordering queue 230 runs out of space (MAX_PERFLOW_BUFFER or a timer expires (OUTOFORDER_TIMER). Whenever a gap (missing packet) in the reordering queue 230 arises, the output stream 201 is interrupted by the time of OUTOFORDER_TIMER. FIG. 3 illustrates this behavior, which regularly leads to latency spikes, determined by the OUTOFORDER_TIMER, if in-order packet sequences alternates with missing packets. Especially higher OSI layers or the end-to-end application, which rely on constant or slow changing latencies, react allergic and may reduce speed or assume link as broken.

Figure 4:
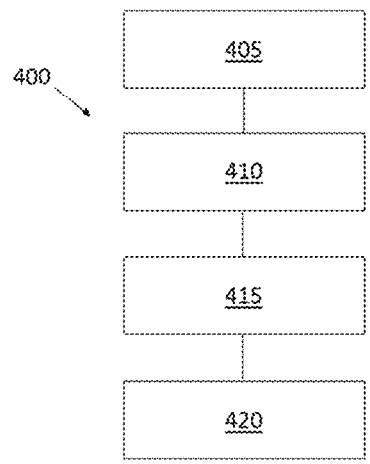
FIG. 4 shows a schematic diagram illustrating a method to reduce latency spikes in a multipath communication system.

To overcome those latency spikes, the invention proposes a method for increasing the efficiency of a multipath communication network. In particular, FIG. 4 shows a schematic diagram illustrating a method 400 to reduce latency spikes in a multipath communication system comprising of the following steps:

Step 405: providing at least a first communication path and a second communication path for exchanging data packets between a sender entity and a receiver entity;

Step 410: using timing information about the first communication path and about the second communication path, wherein a latency of the first communication path and of the second communication path can be calculated based on this timing information;

Step 415: calculating a latency difference $\Delta L$ by using the latency information of the first communication path and of the second communication path;

Step 420: delaying data packets sent over the communication path with the shorter latency value by a time interval $T_{Delay}$ that has at least the length of the latency difference $\Delta L$.

In an embodiment of this invention, the packets on a fast path 250 with low latency, that is the shorter latency value, will be delayed at least by the latency difference compared to the path 252 with highest latency in the transmission process. For this purpose, the latency difference can be calculated as follows:

Path Latency

In a two path multi-path system, the latency difference $\Delta L$ is calculated by the absolute value of the subtract of the first path latency $L_1$ and the second path latency $L_2$.

$$\Delta L = |L2 - L1|$$

In multi-path systems with more than two paths, the latency difference has to be built between the path in use and the path with the highest latency. It follows that each path i has its own latency difference $\Delta L_i$. Wherein the latency difference $\Delta L$ of the path with the highest latency is $\Delta L=0$;

RTT/SRTT

In a two path multi-path system, the latency difference $\Delta L$ is calculated by the absolute value of the subtract of the first path(S) RTT R1 and the second path(S) RTT R2, whereas both values have to be multiplied with the RTT symmetry factor SF. This factor SF reflects the share of the forward or return direction within a(S) RTT. In case both path directions contribute equally to the RTT, SF is 0.5.

$$\Delta L = |R2 * SF2 - R1 * SF1|$$

In multi-path systems with more than two paths, the latency difference has to be built between the path in use and the path with the highest(S) RTT.

One Way Delay (Timestamp)

The sender entity 260 adds to each data packet its sending timestamp, call it Sx (x is packet number). The receiver entity 300 logs for each data packet when it was received (say Tx). If the receiver entity 300 receives two data packets. Say data packet 1 is sent over path 250 and packet 2 over path 252. The latency difference of the two different paths can be estimated by calculating of S2–S1, which is the information how much later packet 2 was sent. Then R2-R1 is calculated. If S1 and S2 have a first same clock, and R1 and R2 have a second same clock then there is no need to synchronize the clocks. For example, if S2–S1 is 10 ms, it is known that paths with equal delays should also have R2–R1=10 ms. If that is not the case then either path 1 is faster or path2 and one can easily calculate this difference by using the formula $\Delta L=|(R2-R1)-(S2-S1)|$.

In an embodiment using MP-DCCP as multi-path network protocol, the required timing information to calculate the path latency difference can be exchanged using the MP_RTT or the DCCP Timestamp option. MP_RTT is for example useful in systems where congestion control (CC) is used to determine a path RTT. Typically, a RTT value calculated by CC is only available on sender side and MP_RTT can be used to provide this information to a receiver located PLDC module. In (MP-)QUIC a timestamp option is discussed in [6] and for TCP defined in [7].

The method 400 can be implemented as a computer program product within various entities of the multipath communication system 200.

Figure 5:
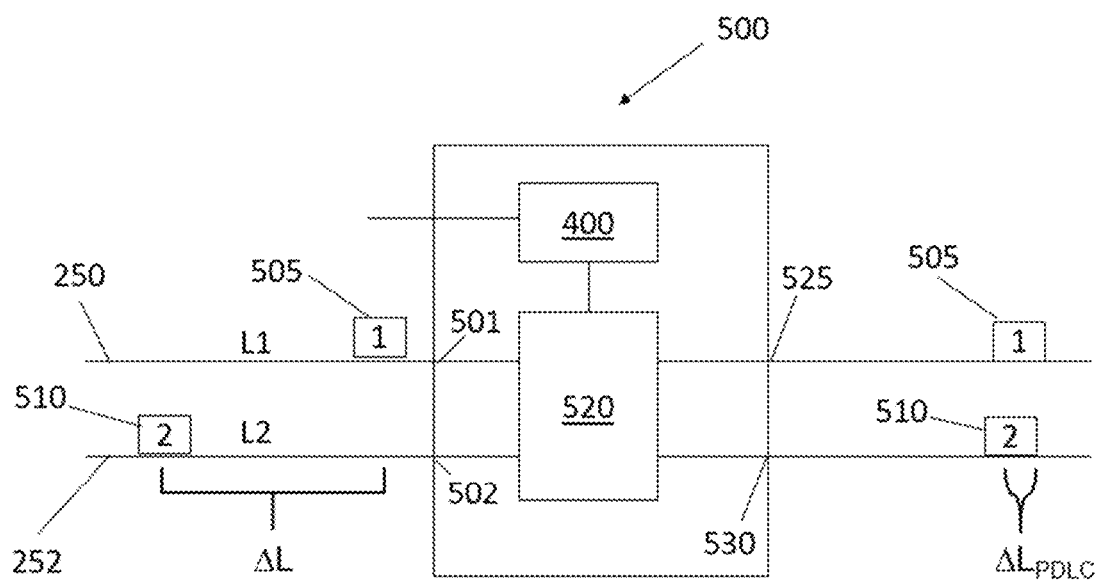
FIG. 5 shows a path latency difference compensator according to the invention.

FIG. 5: shows the principles how the path latency difference compensator 500 of the invention works.

A first data packet 505 with the sequence number 1 is sent over the first communication path 250, wherein a second data packet 510 with the sequence number 2 is sent over the second communication path 252 right after the first data packet 505 has been sent. For the purpose of this illustration, the inter-sent gap is neglected.

Due to the different latencies L2 and L1 of the two communication paths 250, 252, the first data packet 505 and the second data packet 510 arrive with a latency difference that is bigger than the inter-sent gap which introduces latency spikes, wherein those latency spikes are further introduced if out-of-order delivery occurs due to the differences in L2 and L1.

The PDLC 500 comprises a first interface 501 for receiving data packets over the first communication path 250 and a second interface 502 for receiving data packets over the second communication path 252. In principle, it is also possible that the PDLC 500 only has one interface for 501 both communication paths 250, 252. In this case, it is necessary that the data packets comprise information from which the PDLC 500 can deduce over which communication path 250, 252 the respective data packet was sent in order to perform the delay according to the method 400 only to the data packets that have been sent over the communication path with the shorter latency, in this case communication path 250.

An algorithm is implemented on the processing unit within the PDLC 500 that calculates $T_{Delay}$ according to the method 400. It is possible that the PDLC 500 extracts the required timing information itself or that the PDLC 500 receives the required timing information over a data interface or over the first interface 501.

The algorithm generates a steering commands to delay data packets sent over the data path with the shorter latency by the time period of $T_{Delay}$. The algorithm sends the steering commands to a buffering unit 520 that can store and delay the data packets accordingly. In the case illustrated in FIG. 5, the first data packet 505 runs into the buffering unit 520 and is delayed for the time period of $T_{Delay}$, whereas the second data packet 510 is simply forwarded by the buffering unit 520 without any delay. As a consequence, the first data packet 505 and the second data packet 510 leave the PDLC 500 over one or two respective output interfaces 525 and 530 with a reduced and more uniform latency $\Delta L_{PDLC}$. In an embodiment, the latency difference $\Delta L_{PDLC}$ is close or corresponds to the inter-sending-gap of the two data packets 505, 510.

With the accurate latency difference determination that is realized by the invention two goals are achieved. First it provides a uniform end-to-end latency oriented to the path with the highest latency and secondly in-order delivery is guaranteed or at least improved. If the latency difference fluctuates without a compensation due to volatile path characteristics, clock jitter, computational distortion etc., then both goals are at risk.

In scenarios with heterogeneous and volatile path characteristics, e.g. ATSSS, hybrid access or end-to-end multipath implemented in Smartphones, a certain inaccuracy is likely. Hence, PLDC will provide a flat end-to-end latency with some variation and therefore lead to a certain degree of packet scrambling.

In an embodiment of this invention, the techniques of the PLDC 500 that provides flat end-to-end latencies is combined with the techniques of the re-ordering process described in the EP 3 531 637 A1. Hence, the full disclosure of the EP 3 531 637 A1 is hereby incorporated herein in its entirety.

This combination provides therefore a number of new techniques that can be implemented as modules as follows:

A first path latency compensation module that combines reordering techniques according to EP 3 531 637 A1 with the static expiration timer and PLDC 500.

PLDC 500 is used to compensate the latency spikes introduced by the static expiration timer. Instead of calculating the path latency difference between paths and to delay the path with the shorter latency by $T_{Delay}$, the latency difference is determined with respect to the expiration timer value. This has the benefit that a flat end-to-end latency with a re-ordered packet stream in scope of the expiration timer is achieved. However, the end-to-end latency is determined by the expiration timer value.

A different configuration is possible using PLDC 500 to compensate the latency difference among the communication paths 250, 252, followed by the application of the re-ordering process using the static timer according to EP 3 531 637 A1. In this scenario, the compensation of the latency difference reduces the re-ordering effort, although the end-to-end latency might still experience spikes.

A second path latency compensation module that combines reordering techniques according to EP 3 531 637 A1 with the dynamic expiration timer and PLDC 500.

In contrast to the case of the static expiration timer, the timing information used for PLDC 500 are also used to dynamically calculate the time after which a data packet can be assumed to be lost. This provides the same benefit as in the scenario with the static expiration timer, but with a potentially lower end-to-end latency if the real path latencies are below the value for a static timer.

A third path latency compensation module that combines reordering with static expiration timer with fast packet loss detection according to EP 3 531 637 A1 and PLDC 500.

The same flat end-to-end latency is reached as without the fast packet loss detection. However, if it can be assumed that in most scenarios fast packet loss detection reliably identifies packet loss, then PLDC does not have to orient on the static timer value, instead the real path latency difference can be used.

A fourth path latency compensation module that combines reordering with dynamic expiration timer with fast packet loss detection according to EP 3 531 637 A1 and PLDC 500.

In this case, fast packet loss detection allows to orient PLDC to the real path latency difference $\Delta L$. In comparison with the static expiration timer scenario, the dynamic timer provides the advantage of major effectivity in the re-ordering process, specifically if the real latency difference among paths is below the value given for a static timer.

In all embodiments, the latency calculation and/or the delaying of packets can be applied on sender side, on receiver side before the re-ordering process or on receiver side after the re-ordering process. It is also possible that the latency calculation and/or the delaying of packets can be applied on sender side, on receiver side even without applying the re-ordering. In some scenarios, e.g., when the delaying is applied after the re-ordering process it is required that packets are marked for the delaying process and if necessary, carry also the time value (as meta information) for the delay process. Having a sender side PLDC 500 is in particular useful in the following scenarios:

1. The latency difference is built using congestion control determined from timing information on the sender side. This would avoid transmitting this information to the far end and potentially accept outdated timing information.
2. A scheduling strategy can adapt to new conditions during or after PDLC 500 is/was effective. This helps to overcome scenarios where the original scheduling decision was taken because a preferred path was not available, but this changes.

3. In predictable (e.g., static) networks to keep the effort on sender side and allow a slim receiver implementation with nothing more than a simple forwarding engine or at least to keep the effort of a combined receiver PLDC 500 minimal.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

[1] A. Ford and C. Raiciu and M. Handley and O. Bonaventure, "TCP Extensions for Multipath Operation with Multiple Addresses", RFC no. 6824, January 2013
[2] Quentin Coninck and Olivier Bonaventure, "Multipath Extensions for QUIC (MP-QUIC)", draft-deconinck-quic-multipath-05, August 2020
[3] Markus Amend and Anna Brunstrom and Andreas Kassler and Veselin Rakocevic, "DCCP Extensions for Multipath Operation with Multiple Addresses", draft-amend-tsvwg-multipath-dccp-03, November 2019
[4] P. Amer and M. Becke and T. Dreibholz and N. Ekiz and J. Iyengar and P. Natarajan and R. Stewart and M. Tüxen, "Load Sharing for the Stream Control Transmission Protocol (SCTP)", draft-tuexen-tsvwg-sctp-multipath-21, February 2021
[5] GRE
[6] https://datatracker.ietf.org/doc/html/draft-huitema-quic-ts-07
[7] RFC7323

The invention claimed is:

1. A method for increasing the efficiency of a multipath (MP) communication network, the method comprising:
providing at least a first communication path and a second communication path between a sender entity and a receiver entity;
determining timing information about the first communication path and about the second communication path, wherein the timing information comprises a latency L1 of the first communication path and a latency L2 of the second communication path, a round trip time R1 of the first communication path and a round trip time R2 of the second communication path, and/or timestamps of a data field of a first data packet sent via the first communication path and a second data packet sent via the second communication path, wherein the latency is a travel time of a data packet between the sender entity and the receiver entity;
calculating a latency difference ΔL by using the timing information of the first communication path and of the second communication path;
delaying data packets to be sent over a communication path out of the first and second communication paths with the shorter latency value by a time interval $T_{Delay}$ that has at least the length of the latency difference ΔL, wherein the delaying is performed by the sender entity, the receiver entity, and/or a server associated to a telecommunication provider;
transmitting data packets over the first and second communication paths;
queuing the transmitted data packets in a reordering queue;
reordering, by the reordering queue, the data packets; and
providing, by the reordering queue, the data packets to the receiver entity;
wherein:
i) when $T_{static} > L_i$: $T_{Delay}$ has at least the length of the latency difference ΔL plus $(T_{static} - L_i)$, wherein $T_{static}$ is the time length of a static expiration timer of the reordering queue of the receiver entity, and $L_i$ is the highest latency value of the first or the second communication path, wherein the data packets to be sent over the communication path with the shorter latency are delayed by $T_{Delay} = ΔL$ plus $(T_{static} - L_i)$, and wherein data packets to be sent over a communication path out of the first and second communication paths with the higher latency are delayed by $T_{Delay} = (T_{static} - L_i)$; or
ii) when $T_{dynamic} > L_i$: $T_{Delay}$ has at least the length of the latency difference ΔL plus $(T_{dynamic} - L_i)$, wherein $T_{dynamic}$ is the time length of a dynamic expiration timer of the reordering queue of the receiver entity, and $L_i$ is the highest latency value of the first or the second communication path, wherein the data packets to be sent over the communication path with the shorter latency are delayed by $T_{Delay} = ΔL$ plus $(T_{dynamic} - L_i)$, and wherein the data packets to be sent over the communication path with the higher latency are delayed by $T_{Delay} = (T_{dynamic} - L_i)$.

2. The method of claim 1, wherein the timing information is determined based on:
using known technical parameters of the first communication path and the second communication path; and/or
sending at least the first data packet over the first communication path and the second data packet over the second communication path and measuring the timing information.

3. The method of claim 1, wherein the timestamps of the data field use synchronized clocks.

4. The method of claim 1, wherein the timing information is exchanged by using a Multipath Round Trip Time (MP_RTT), Quick UDP Internet Connection (QUIC), Transport Control Protocol (TCP) and/or Datagram Congestion Control Protocol (DCCP) timestamp option when a MP-DCCP, MP-QUIC, and/or MP-TCP protocol is applied between the sender entity and the receiver entity.

5. The method of claim 1, wherein the latency difference ΔL between the sender entity and the receiver entity is stored within the table.

6. The method of claim 1, wherein the latency difference ΔL is dynamically adjusted.

7. The method of claim 1, wherein a respective offset value $T_{Offset}$ is added to $T_{Delay}$ in order to delay respective data packets.

8. The method of claim 1, wherein the data packets are delayed within the sending entity, between the sending entity and the receiving entity, and/or within the receiving entity.

9. A Path Latency Difference Compensator (PLDC) for increasing the efficiency of a multipath (MP) communication network, wherein the PLDC comprises:
   an input interface;
   an output interface;
   a processor; and
   a buffer;
   wherein the input and output interfaces are connected to first and second communication paths between a sender entity and a receiver entity;
   wherein the processor is configured to:
      determine timing information about the first communication path and about the second communication path, wherein the timing information comprises a latency L1 of the first communication path and a latency L2 of the second communication path, a round trip time R1 of the first communication path and a round trip time R2 of the second communication path, and/or timestamps of a data field of a first data packet sent via the first communication path and a second data packet sent via the second communication path, wherein the latency is a travel time of a data packet between the sender entity and the receiver entity;
      calculate a latency difference ΔL by using the timing information of the first communication path and of the second communication path;
      generate instructions to delay data packets to be sent over a communication path out of the first and second communication paths with the shorter latency by a time interval $T_{Delay}$ that has at least the length of the latency difference ΔL; and
      send the generated instructions to a buffer; and
   wherein the buffer is configured to delay the data packets to be sent over the communication path with the shorter latency by $T_{Delay}$ before forwarding the data packets to be sent over the communication path with the shorter latency via the output interface;
   wherein:
      i) when $T_{static} > L_i$: $T_{Delay}$ has at least the length of the latency difference ΔL plus $(T_{static} - L_i)$, wherein $T_{static}$ is the time length of a static expiration timer of the reordering queue of the receiver entity, and $L_i$ is the highest latency value of the first or the second communication path, wherein the data packets to be sent over the communication path with the shorter latency are delayed by $T_{Delay} = ΔL$ plus $(T_{static} - L_i)$, and wherein data packets to be sent over a communication path out of the first and second communication paths with the higher latency are delayed by $T_{Delay} = (T_{static} - L_i)$; or
      ii) when $T_{dynamic} > L_i$: $T_{Delay}$ has at least the length of the latency difference ΔL plus $(T_{dynamic} - L_i)$, wherein $T_{dynamic}$ is the time length of a dynamic expiration timer of the reordering queue of the receiver entity, and $L_i$ is the highest latency value of the first or the second communication path, wherein the data packets to be sent over the communication path with the shorter latency are delayed by $T_{Delay} = ΔL$ plus $(T_{dynamic} - L_i)$, and wherein the data packets to be sent over the communication path with a higher latency are delayed by $T_{Delay} = (T_{dynamic} - L_i)$.

10. A network entity, wherein the network entity comprises the PLDC according to claim 9.

11. A multipath communication system, wherein the multipath communication system comprises:
   the sender entity;
   the receiver entity; and
   the PLDC according to claim 9;
   wherein the PLDC is arranged between the sender entity and the receiver entity, and/or the PLDC is implemented within the sender entity and/or the receiver entity.

12. A non-transitory computer-readable medium having processor-executable instructions stored thereon for increasing the efficiency of a multipath (MP) communication network, wherein the processor-executable instructions, when executed, facilitate performance of the following:
   providing at least a first communication path and a second communication path for exchanging data packets between a sender entity and a receiver entity;
   determining timing information about the first communication path and about the second communication path, wherein the timing information is a latency L1 of the first communication path and a latency L2 of the second communication path, a round trip time R1 of the first communication path and a round trip time R2 of the second communication path, and/or timestamps of a data field of a first data packet sent via the first communication path and a second data packet sent via the second communication path, wherein the latency is a travel time of a data packet between the sender entity and the receiver entity;
   calculating a latency difference ΔL by using the timing information of the first communication path and of the second communication path; and
   delaying data packets sent over the communication path with the shorter latency value by a time interval $T_{Delay}$ that has at least the length of the latency difference ΔL, wherein the delaying is performed by the sender entity, the receiver entity, and/or a server associated to a telecommunication provider;
   wherein data packets transmitted over the first or the second communication path are queued in a reordering queue, wherein the reordering queue reorders the data packets and provides the data packets to the receiver;
   providing at least a first communication path and a second communication path between a sender entity and a receiver entity;
   determining timing information about the first communication path and about the second communication path, wherein the timing information comprises a latency L1 of the first communication path and a latency L2 of the second communication path, a round trip time R1 of the first communication path and a round trip time R2 of the second communication path, and/or timestamps of a data field of a first data packet sent via the first communication path and a second data packet sent via the second communication path, wherein the latency is a travel time of a data packet between the sender entity and the receiver entity;

calculating a latency difference ΔL by using the timing information of the first communication path and of the second communication path;

delaying data packets to be sent over a communication path out of the first and second communication paths with the shorter latency value by a time interval $T_{Delay}$ that has at least the length of the latency difference ΔL, wherein the delaying is performed by the sender entity, the receiver entity, and/or a server associated to a telecommunication provider;

transmitting data packets over the first and second communication paths;

queuing the transmitted data packets in a reordering queue:

reordering, by the reordering queue, the data packets; and providing, by the reordering queue, the data packets to the receiver entity:

wherein:

i) when $T_{static} > L_i$: $T_{Delay}$ has at least the length of the latency difference ΔL plus $(T_{static} - L_i)$, wherein $T_{static}$ is the time length of a static expiration timer of the reordering queue of the receiver entity, and $L_i$ is the highest latency value of the first or the second communication path, wherein the data packets to be sent over the communication path with the shorter latency are delayed by $T_{Delay} = ΔL$ plus $(T_{static} - L_i)$, and wherein data packets to be sent over a communication path out of the first and second communication paths with the higher latency are delayed by $T_{Delay} = (T_{static} - L_i)$; or ii) when $T_{dynamic} > L_i$: $T_{Delay}$ has at least the length of the latency difference ΔL plus $(T_{dynamic} - L_i)$, wherein $T_{dynamic}$ is the time length of a dynamic expiration timer of the reordering queue of the receiver entity, and $L_i$ is the highest latency value of the first or the second communication path, wherein the data packets to be sent over the communication path with the shorter latency are delayed by $T_{Delay} = ΔL$ plus $(T_{dynamic} - L_i)$, and wherein the data packets to be sent over the communication path with the higher latency are delayed by $T_{Delay} = (T_{dynamic} - L_i)$.

* * * * *